US006300910B1

(12) United States Patent
Kim (10) Patent No.: US 6,300,910 B1
(45) Date of Patent: Oct. 9, 2001

(54) ANTENNA DEVICE INSTALLED IN FLIP COVER OF FLIP-UP TYPE PORTABLE PHONE

(75) Inventor: Jong-Kwang Kim, Kuml-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/400,578

(22) Filed: Sep. 22, 1999

(30) Foreign Application Priority Data

Oct. 7, 1998 (KR) .................................................. 98-41839

(51) Int. Cl.[7] ....................................................... H01Q 1/24
(52) U.S. Cl. ............................ 343/702; 343/895; 343/906
(58) Field of Search .................................. 343/702, 895, 343/900, 901, 906; 455/90; H01Q 1/24

(56) References Cited

U.S. PATENT DOCUMENTS

| | | | |
|---|---|---|---|
| 5,170,173 | * 12/1992 | Krenz et al. | 343/702 |
| 5,353,036 | * 10/1994 | Baldry | 343/702 |
| 5,508,709 | * 4/1996 | Krenz et al. | 343/702 |
| 5,513,383 | * 4/1996 | Tsao | 343/702 |
| 5,945,954 | * 8/1999 | Johnson | 343/702 |
| 5,969,682 | * 10/1999 | Ito et al. | 343/702 |
| 6,011,519 | * 1/2000 | Sadler et al. | 343/742 |
| 6,031,495 | * 2/2000 | Simmons et al. | 343/702 |

FOREIGN PATENT DOCUMENTS

| | | |
|---|---|---|
| 323 614 A2 | 7/1989 | (EP) . |
| 0 661 825 A1 | 7/1995 | (EP) . |
| 0 928 092 A2 | 7/1999 | (EP) . |
| 2 601 211 | 1/1988 | (FR) . |
| 2 293 275 A | 3/1996 | (GB) . |
| WO 99 43042 | 8/1999 | (WO) . |

* cited by examiner

Primary Examiner—Hoanganh Le
(74) Attorney, Agent, or Firm—Dilworth & Barrese, LLP (57) ABSTRACT

An antenna device installed in a cover of a flip-up or folder type portable phone. In the flip-up type portable phone, a body of the phone has an exposed LCD (Liquid Crystal Display) and a main board. The flip cover is mechanically connected to the body by hinges and has necks extended from both sides of the flip cover, at least one of the necks including a duct. The antenna device has a portion fixed in the cover and a portion inserted into the duct and is electrically connected to the main board of the body.

12 Claims, 9 Drawing Sheets

ANTENNA DEVICE INSTALLED IN FLIP COVER OF FLIP-UP TYPE PORTABLE PHONE

CLAIM OF PRIORITY

This application makes reference to, incorporates the same herein, and claims all benefits accruing under 35 U.S.C. §119 from an application entitled ANTENNA DEVICE INSTALLED IN FLIP COVER OF FLIP-UP TYPE PORTABLE PHONE earlier filed in the Korean Industrial Property Office on Oct. 7, 1998, and there duly assigned Serial No. 98-41839.

BACKGROUND OF THE INVENTION

1. Field of the Invention

The present invention relates to a flip-up type or folder type portable phone, at and more particularly, to an antenna device installed in a flip cover of a flip-up type portable phone or in a folder cover of a folder type portable phone.

2. Description of the Related Art

Portable phones are generally grouped into a bar type, a flip type, and a folder type. In the bar type, an antenna device is located at a top edge of a body, and under the antenna device are sequentially disposed an ear piece including a speaker, an LCD (Liquid Crystal Display), and a key pad including a plurality of keys. A microphone is disposed in a lowermost portion of the body.

A folder type portable phone is comprised of a body, a folder cover, and a hinge for mechanically connecting the body to the folder cover. An ear piece including a speaker is located in the folder cover. An antenna device is located at a top edge of the body, an LCD and a key pad are sequentially disposed under the antenna device, and a microphone is located in a lowermost portion of the body. Hinges for the folder type mobile phone for connecting the body to the folder cover are disposed at the uppermost end of the body.

A flip-type portable phone is comprised of a body, a flip cover, and a hinge for mechanically connecting the body to the flip cover. In the flip-type portable phone, an antenna device is located at a top edge of the body, and under the antenna device are sequentially disposed an ear piece including a speaker, an LCD, a key pad including a plurality of keys, and a microphone, which may be disposed in the flip cover, and is exposed when the flip cover is opened downwardly from the body.

A flip-up type portable phone is a type of flip type portable phone, in which the hinges are disposed on the body in the vicinity of each side of the LCD, thus allowing for opening or closing a flip cover. Each hinge has a rotating shaft at a side of the LCD. In prior art flip-up type phones, a speaker is located within the flip cover, and a wire is extended from the speaker and electrically connected to a main board of the body through the hinges. Ducts formed in necks of the flip cover define a path for electrically connecting the flip cover to the main board of the body. The flip cover has a rotating shaft at both sides of the LCD, which is exposed regardless of the opened or closed state of the flip cover. The flip cover is so configured as to be opened by being rotated upward from the body. A flip-up type portable phone and its hinges are disclosed in detail in Korea Application No. 97-76184, filed by Samsung Electronics, which is incorporated herein by reference.

To obtain high quality transmission and reception for conventional flip and folder type portable phones, a separately procured antenna device is installed at a top edge of the body. This disadvantageously increases the structural complexity of the phone. Furthermore, this imposes design constraints on the phone, as the antenna device has to be confined to the top edge of the body. As design issues are more significant for portable phones than for many other electronic appliances, this design constraint poses a significant obstacle to the successful development and production of portable phones.

A further problem of conventional flip-up type and folder type portable phones is the inconvenience entailed when extending a rod antenna of the antenna device while the flip cover is opened for a call, since the flip cover in effect will overlay the antenna.

SUMMARY OF THE INVENTION

An object of the present invention is to provide an antenna device installed in a flip cover of a portable phone.

Another object of the present invention is to provide a convenient antenna device in a portable phone.

A further object of the present invention is to provide an antenna device in a portable phone, which can be made in various designs.

To achieve the above objects, an antenna device installed in a flip cover of a flip-up type or folder type portable phone is provided. In the flip-up type portable phone, a body of the phone has an exposed LCD (Liquid Crystal Display) and a main board. The flip cover is mechanically connected to the body by hinges and has necks extended from both sides of the flip cover, at least one of the necks including a duct forming a passageway between the flip cover to the internal cavity of the main body. The antenna device has a portion fixed in a groove in the cover and a portion inserted through the duct, and is electrically connected to the main board of the body.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Preferred embodiments of the present invention will be described in detail with reference to the attached drawings. Like reference numerals denote the same components in the drawings. It is to be noted that a detailed description of a known function or structure of the present invention has been omitted if it was deemed to obscure the subject matter of the present invention.

Figure 1:
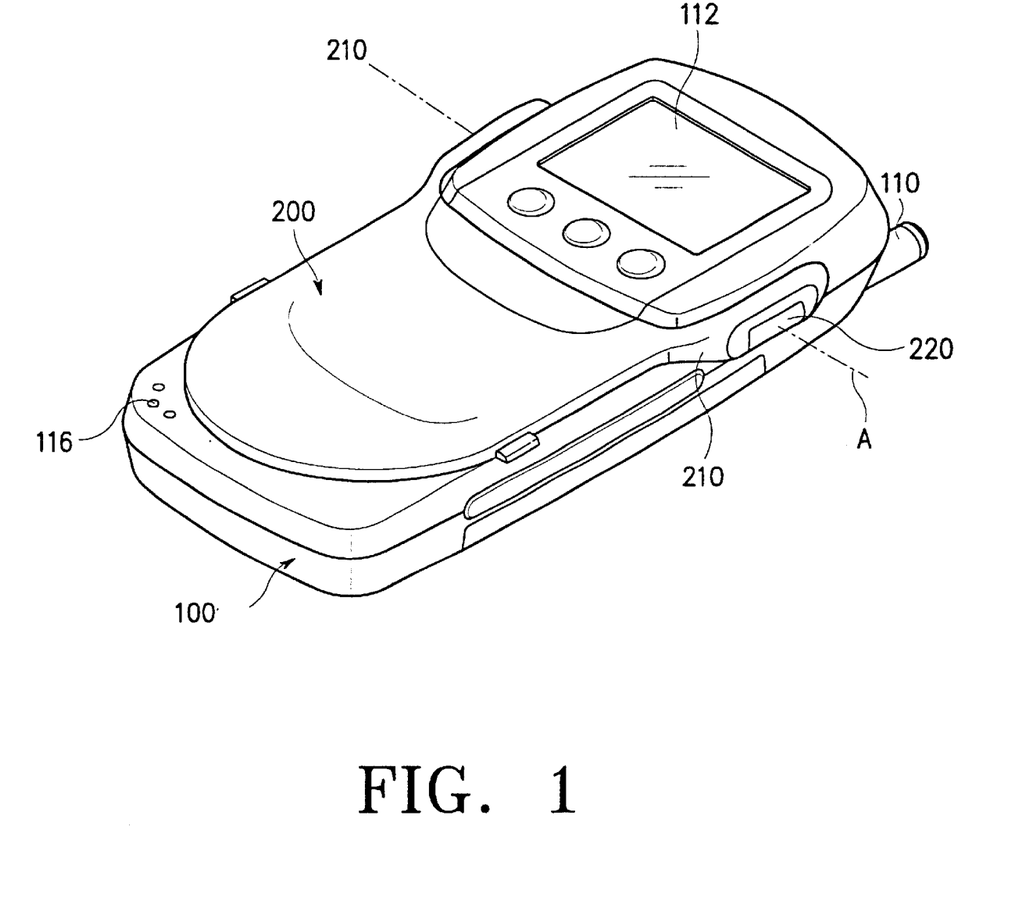
FIG. 1 is a perspective view of a flip-up type portable phone.

FIG. 1 is a perspective view of a flip-up type portable phone according to a first preferred embodiment of the present invention. The following description is set out with the understanding that the present invention is adaptable to a folder type portable phone because in both types the flip cover and the folder cover are opened by hinges, protect key pads, and are flipped up to open. Hinges of the flip-up type portable phone are disposed at both sides of an LCD, whereas those of the folder type portable phone are installed at an uppermost end of the body.

Referring to FIG. 1, the flip-up type portable phone of the present invention is comprised of a body 100, a flip cover 200, and hinges (not shown) for mechanically connecting the body 100 to the flip cover 200. As in the prior art, the hinges are installed at both sides of an LCD 112 so that the flip cover 200 is opened around a rotating axis A. The LCD 112 is exposed regardless of the opened or closed state of the flip cover 200. An antenna housing 110 is provided at an uppermost end of the body 100, for holding a helical antenna (not shown). Under the antenna housing 110 are sequentially arranged the LCD 112 and a keypad (not shown) covered with the flip cover 200. A microphone 116 is disposed in a lowermost portion of the body.

Figure 2:
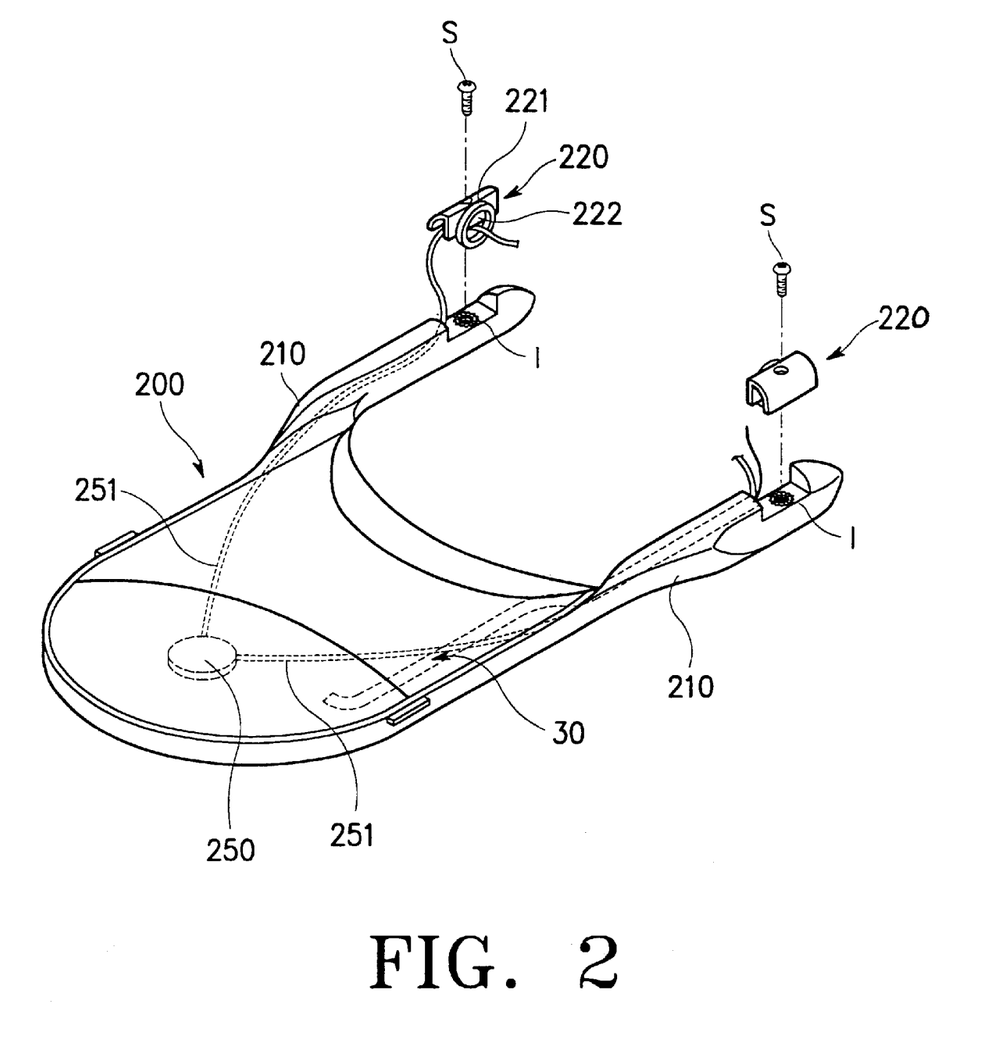
FIG. 2 is a perspective bottom view of a flip cover of a flip-up type portable phone according to a first preferred embodiment of the present invention.
Figure 3:
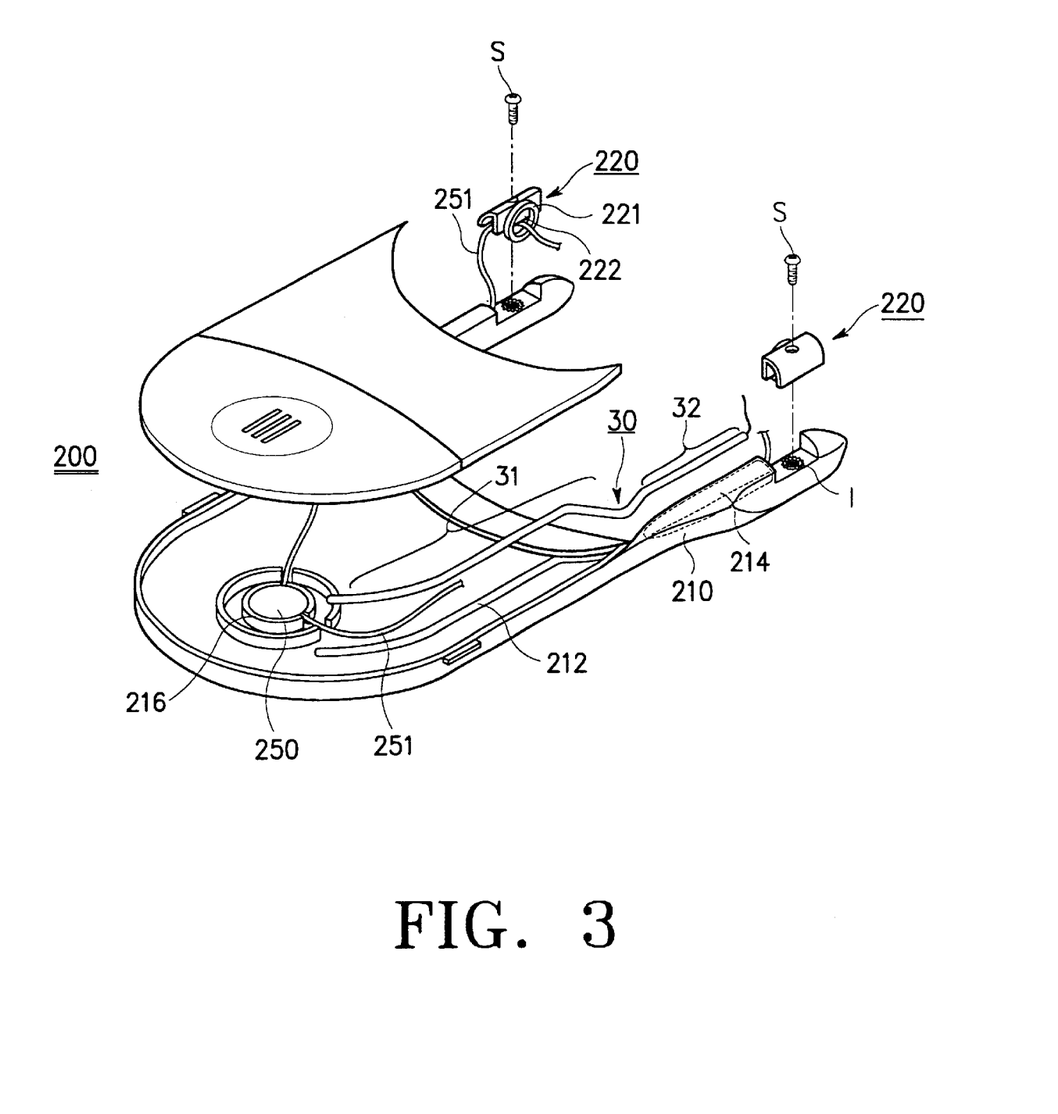
FIG. 3 is an exploded perspective bottom view of the flip cover of FIG. 3 having an antenna device according to the first preferred embodiment.
Figure 4:
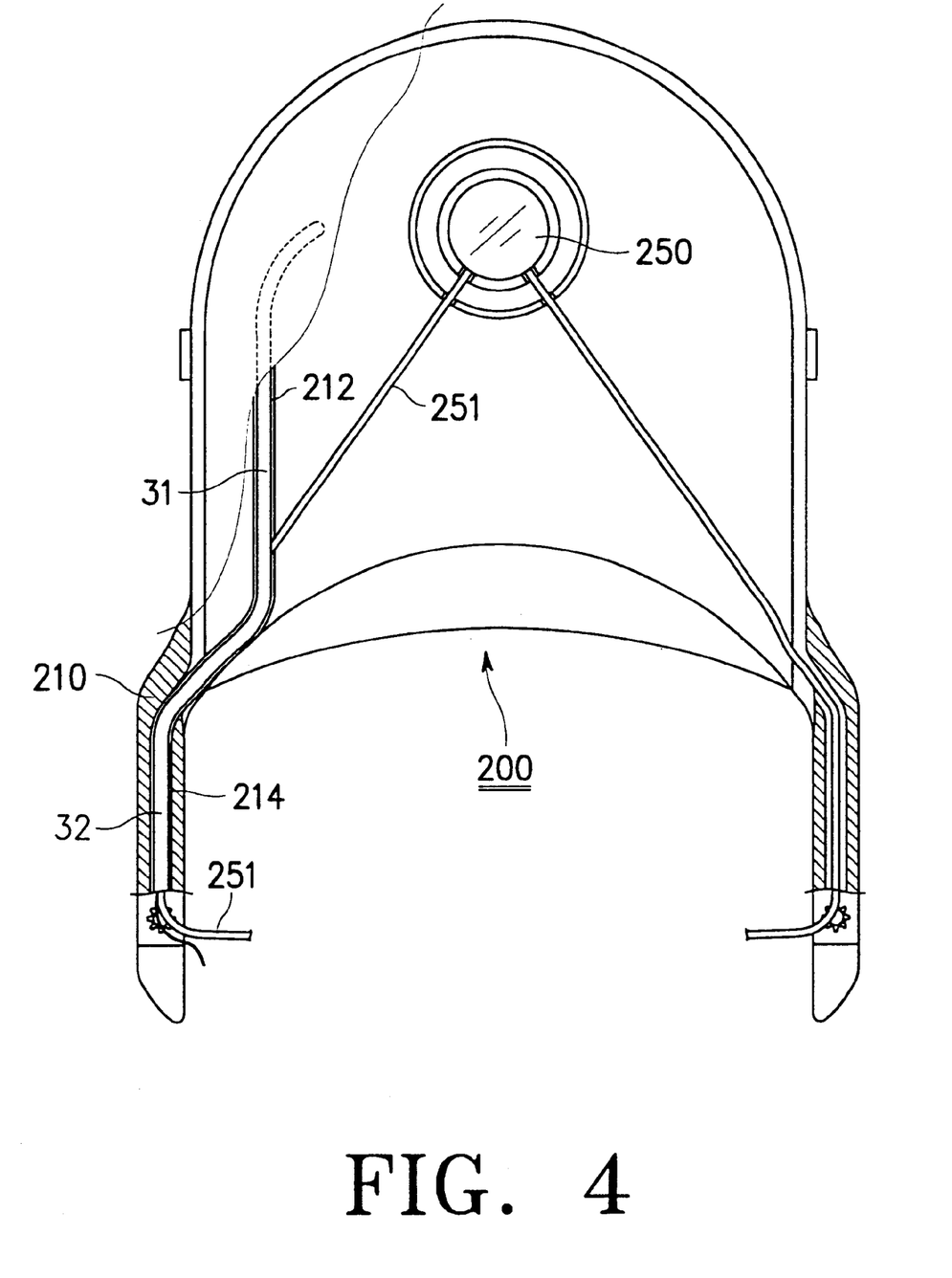
FIG. 4 is a partial sectional plan view of the flip cover of FIG. 3 having the antenna device according to the first preferred embodiment.

The flip cover 200 includes an antenna device and an ear piece having a speaker built therein (as depicted in FIGS. 2 and 3). The flip cover 200 has necks 210 extended from both sides thereof and is hinged to the body 100 by use of flip dummies 220. FIG. 2 is a perspective view of the flip cover. FIGS. 3 and 4 are an exploded perspective view and a partial sectional plan view, respectively, of the antenna device installed in the flip cover according to the first preferred embodiment of the present invention.

Referring to FIGS. 2, 3, and 4, the flip cover 200 of the present invention is comprised of a speaker 250 and an antenna device 30. The flip cover 200 is hinged to the body 100 by use of screws S, insertion holes I, and the flip dummies 220. The speaker 250 is fixedly fit into a rib 216 protruding from a base plate of the flip cover 200. Being extended from the speaker 250, wires 251 are directed toward the body 100 through ducts 214 formed in the necks 210 of the flip cover 200, and through holes 222 formed in cylindrical members 221 of the flip dummies 220.

The antenna device 30 is a core wire surrounded with an insulating tube, and is installed in the flip cover 200. A groove 212 is formed in the flip cover 200 to receive the antenna device 30. A portion 31 of the antenna device 30 may be held in the groove 212 by an adhesive means such as adhesive tape, and the other portion 32 thereof is inserted into one of the ducts 214.

In accordance with the first embodiment of the present invention, the flip cover 200 includes the speaker 250 and the antenna device 30. Both wires 251 are extended from the speaker 250 and directed toward the body 100 through the ducts 214 and the flip dummies 220. The core wire of the antenna device 30 is electrically connected to a main board of the body 100, and extends through one of the ducts 214 and one of the flip dummies 220.

When a user opens the flip cover 200 for a call, the portable phone is automatically set to a speech mode and the antenna device 30 begins to operate. The user then benefits from the combined transmission and reception power of the two antennas. Alternatively, the helical antenna (not shown) and the antenna housing 110 may be omitted from the portable phone. In either case, the resulting portable phone is structurally simple and is very convenient to use and design, thus contributing to an increase of productivity and facilitating further design improvements to the portable phone.

Figure 5:
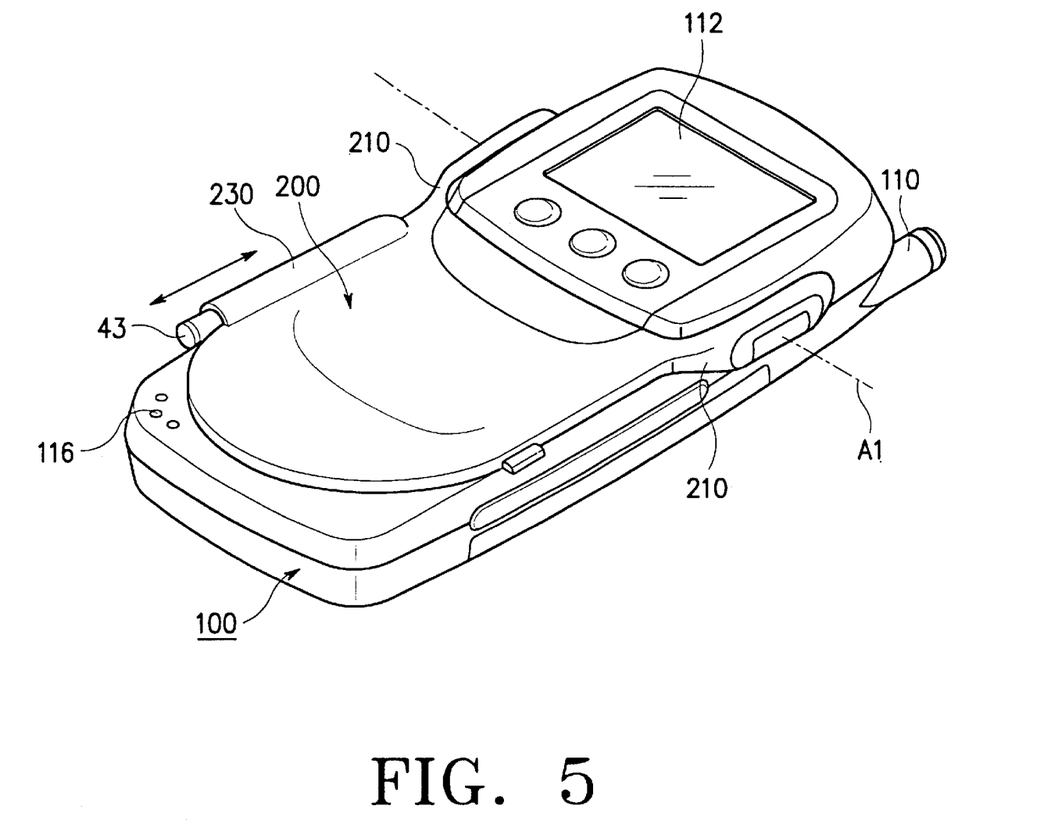
FIG. 5 is a perspective view of a flip-up type portable phone according to a second preferred embodiment of the present invention.

FIG. 5 is a perspective view of a flip-up type portable phone according to a second preferred embodiment of the present invention. Referring to FIG. 5, the portable phone is comprised of the body 100, the flip cover 200, and hinges (not shown) for mechanically connecting the body 100 to the flip cover 200. A helical antenna (not shown) is held in the antenna housing 110 located at a top edge of the body 100. Under the antenna housing 110 are sequentially disposed the LCD 112 and a keypad (not shown) covered by the flip cover 200. The microphone 116 is arranged in a lowermost portion of the body 100. A rod antenna 400 (see FIGS. 6 and 7) is installed in the flip cover 200 in antenna housing 230, and the flip cover 200 moves between opened and closed positions around the rotating axis A1.

Figure 6:
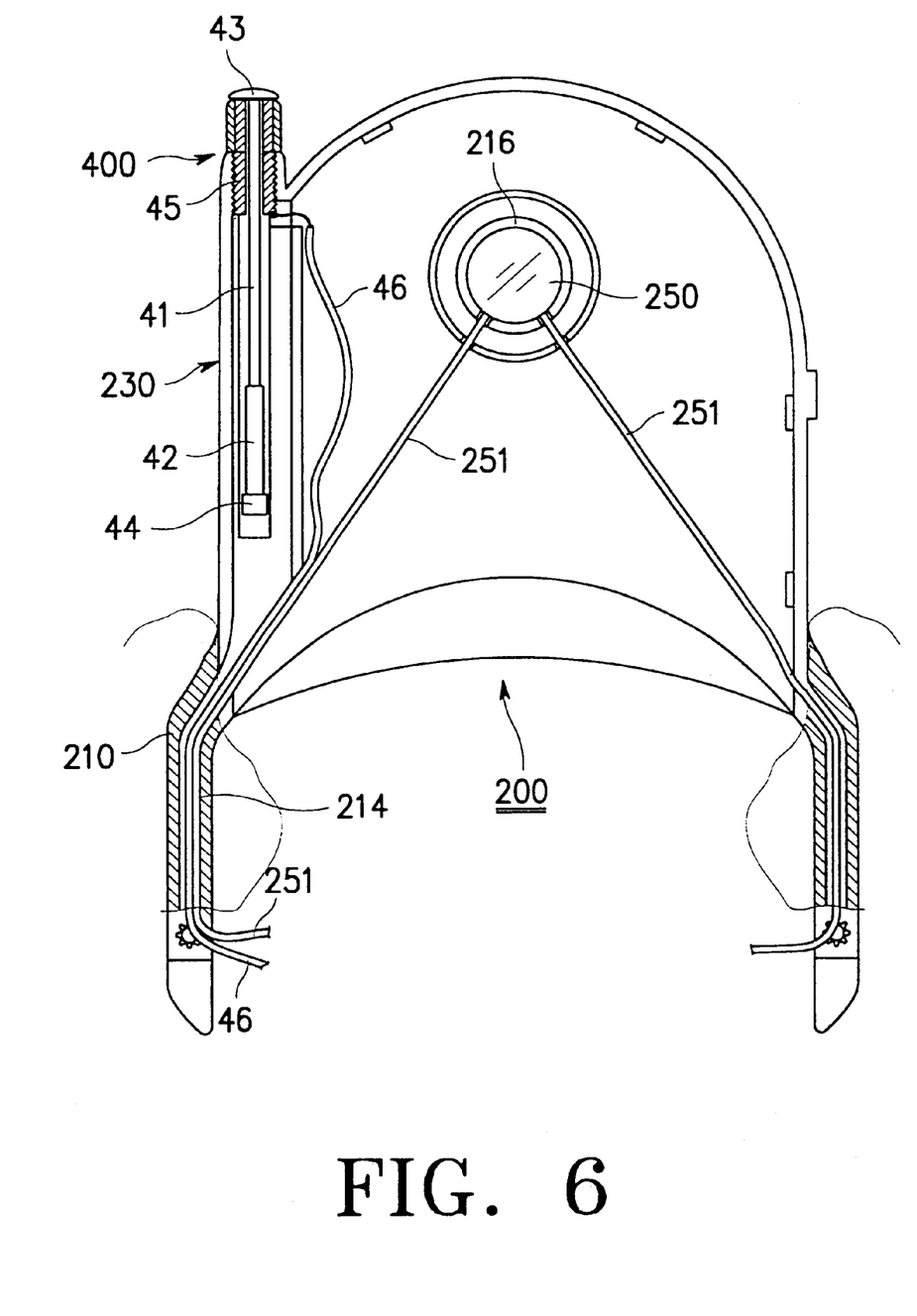
FIG. 6 is a partial plan view of the flip cover of FIG. 5 having an antenna device with a rod antenna retracted according to the second preferred embodiment.
Figure 7:
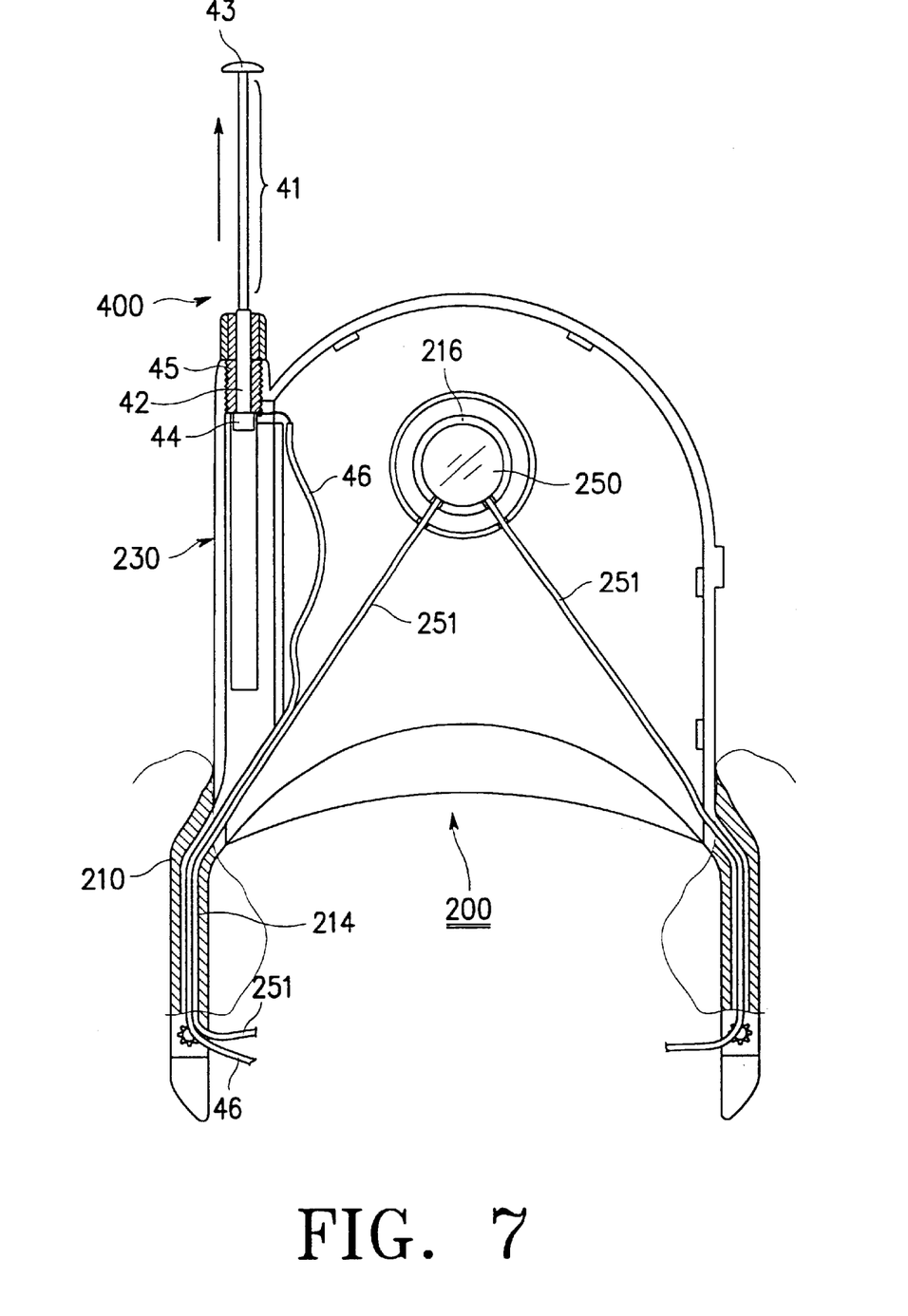
FIG. 7 is a partial plan view of the flip cover of FIG. 5 having the antenna device with the rod antenna extended according to the second preferred embodiment.

FIGS. 6 and 7 are partial sectional plan views of an antenna device installed in the flip cover 200 with the rod antenna 400 retracted and extended, respectively, according to the second preferred embodiment of the present invention. The rod antenna 400 and the speaker 250 are provided in the flip cover 200. The speaker 250 is fixedly fit in the rib 216 of the flip cover 200 and the wires 251 are extended from the speaker 250 and connected to the body 100 through the ducts 214 of the neck 210.

The rod antenna 400 is extended from and retracted into a cylindrical antenna housing 230 disposed at a side of the flip cover 200. The rod antenna 400, which has a cap 43 secured to an end thereof, is divided into an insulating portion 41 and a conductive portion 42. A metallic stopper 44 is secured to an end of the conductive portion 42.

The rod antenna 400 makes a linear movement through a conductive antenna bushing 45 secured to an end of the antenna housing 230. The antenna bushing 45 is electrically connected to the main board of the body by a wire 46. An end of the wire 46 is fixedly soldered to the antenna bushing 45, and the wire 46 is directed toward the body through a duct 214 of one of the necks 210.

In FIG. 6, the insulating and conductive portions 41 and 42 are located within the antenna housing 230 when the rod antenna 400 is retracted. When the rod antenna 400 is extended, the insulating portion 41 is exposed outward, and the conductive portion 42 contacts the antenna bushing 45, as shown in FIG. 7. When a user opens the flip cover 200 for a call and transmit/receive sensitivity is poor, the user may thus extend the rod antenna 400 to operate the antenna device.

Figure 8:
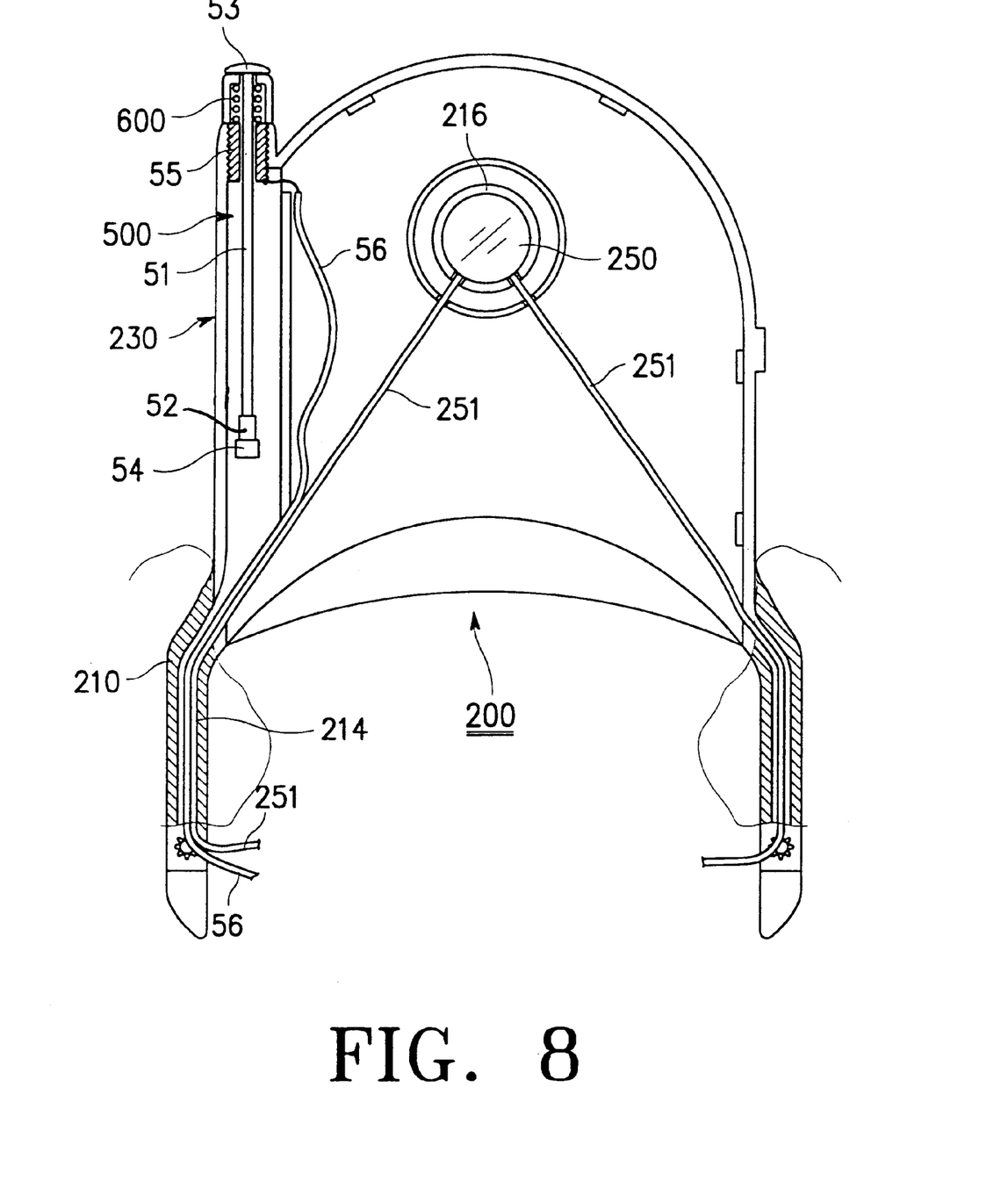
FIG. 8 is a partial plan view of a flip cover having an antenna device with a rod antenna retracted according to a third preferred embodiment.
Figure 9:
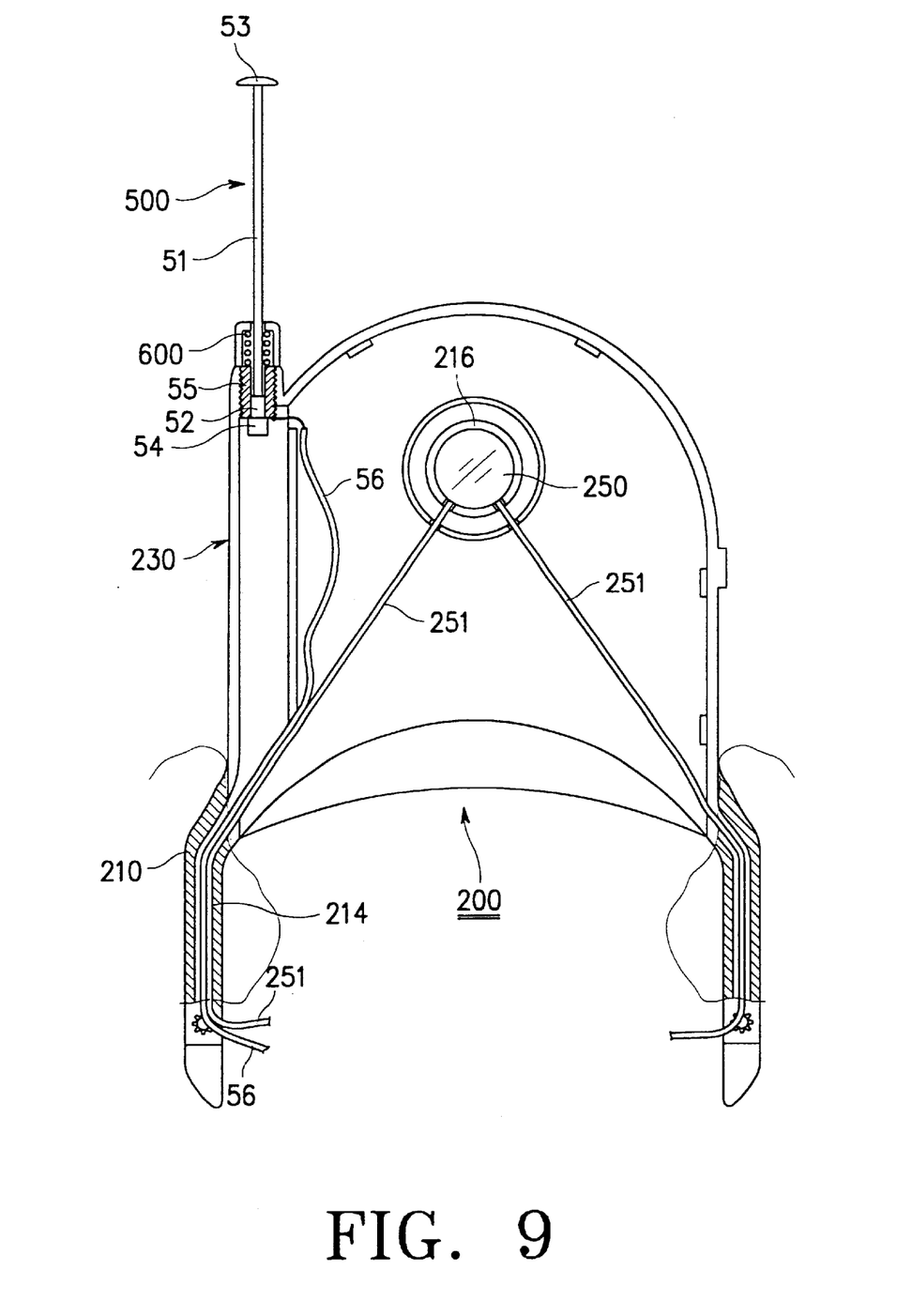
FIG. 9 is a partial plan view of the flip cover of FIG. 8 having the antenna device with the rod antenna extended according to the third preferred embodiment.

FIGS. 8 and 9 are partial sectional plan views of a flip cover having an antenna device installed therein with a rod antenna retracted and extended, respectively, according to a third preferred embodiment of the present invention. Referring to FIGS. 8 and 9, the speaker 250 is fixedly fit in the rib 216 of the flip cover 200 and the wires 251 are extended from the speaker 250 and connected to the body 100 through the ducts 214 of the neck 210. A rod antenna 500 and a helical antenna 600 are held in the cylindrical antenna housing 230 of the flip cover 200. The rod antenna 500 is comprised of a conducting portion 52 having a stopper 54 secured to an end thereof and an insulating portion 51 having a cap 53 secured to an end thereof. A conductive antenna bushing 55 is installed near an end portion of the antenna housing 230. The helical antenna 600 is supported between an end of the antenna housing 230 and the antenna bushing 55, and the rod antenna 500 is extended/retracted through the helical antenna 600 and the antenna bushing 55.

An end of the helical antenna 600 makes contact with the antenna bushing 55. The conducting portion 52 of the rod antenna 500 is electrically connected to the antenna bushing 55 by coming into surface contact with the antenna bushing 55 when the rod antenna 500 is extended. In FIG. 8, with the rod antenna 500 retracted, the insulating and conducting portions 51 and 52 of the rod antenna 500 are located within the antenna housing 230. In FIG. 9, with the rod antenna 500 extended, the insulating portion 51 is exposed and the conducting portion 52 makes surface contact with the antenna bushing 55. The antenna bushing 55 is electrically connected to the main board of the body by a wire 56. The wire 56 is directed toward the body through a duct 214 of the neck 210. An end of the wire 56 is fixedly soldered to the antenna bushing 55.

When a user opens the flip cover 200 for a call and transmit/receive sensitivity is poor, the rod antenna 500 may be extended to operate the rod antenna. When the rod antenna 500 is retracted, the helical antenna 600 acts as a main antenna.

In accordance with the present invention as described above, an antenna device is located within a flip cover in a flip-up type portable phone. The present invention offers the benefits of user friendliness, a variety of designs, and enhanced assembly and productivity. Furthermore, the present invention is adaptable to a folder type portable phone.

While the present invention has been described in detail with reference to the specific embodiments, they are mere exemplary applications. For example, the antenna core wire may be formed integrally with the flip cover during injection molding of the flip cover, or a conductive line may be formed into a predetermined shape in the flip cover to function as an antenna. Thus, it is to be clearly understood that many variations can be made by one skilled in the art within the scope and spirit of the present invention.

What is claimed is:

1. A flip type portable phone comprising:
   a body;
   a cover having an ear piece and an extended neck that has a duct in a longitudinal direction with respect to the body, rotatably connected to the body for movement between an open and closed position by a pair of hinges; and
   an antenna device having a portion fixed in the cover and a portion inserted through the duct and extending to the body for electrical connection therewith.

2. The portable phone of claim 1, wherein the body includes a second antenna.

3. The portable phone of claim 2, wherein said second antenna is a helical antenna.

4. The portable phone of claim 1, wherein said antenna is disposed in an antenna housing, and said antenna housing is disposed in said cover.

5. A flip type portable phone comprising:
   a body;
   a cover having an ear piece and an extended neck that has a duct in a longitudinal direction with respect to the body, rotatably connected to the body for movement between an open and closed position by a pair of hinges, said cover having an antenna housing;
   an antenna bushing comprising a metallic conductor in electrical communication with the body; and
   a rod antenna held in the antenna housing and including a conductive portion, whereby the rod antenna may be extended from the antenna housing so as to bring the conductive portion of the rod antenna into electrical contact with the antenna bushing.

6. The portable phone of claim 5, wherein the body includes a second antenna.

7. The portable phone of claim 6, wherein said second antenna is a helical antenna.

8. The portable phone of claim 5, wherein one of said hinges includes a duct through which extends a wire for electrically connecting the antenna to the body.

9. A flip type portable phone comprising:
   a body;
   a cover having an ear piece and an extended neck that has a duct in a longitudinal direction with respect to the body, rotatably connected to the body and having an antenna housing;
   an antenna bushing comprising a metallic conductor in electrical communication with the body;
   a helical antenna in electrical contact with the antenna housing; and
   a rod antenna held in the antenna housing and including a conductive portion, wherein the rod antenna may be extended from the antenna housing so as to bring the conductive portion of the rod antenna into electrical contact with the antenna bushing.

10. The portable phone of claim 9, wherein the body includes an additional antenna.

11. The portable phone of claim 10, wherein said additional antenna is a helical antenna.

12. The portable phone of claim 9, wherein the cover is rotatably connected to the body by a pair of hinges, one of said hinges including a duct through which extends a wire for electrically connecting the helical and rod antennas to the body.

* * * * *